(12) United States Patent
Genz

(10) Patent No.: US 12,476,569 B2
(45) Date of Patent: Nov. 18, 2025

(54) TOOL BROWNOUT MANAGEMENT

(71) Applicant: Snap-on Incorporated, Kenosha, WI (US)

(72) Inventor: Jason S. Genz, Greendale, WI (US)

(73) Assignee: Snap-on Incorporated, Kenosha, WI (US)

( * ) Notice: Subject to any disclaimer, the term of this patent is extended or adjusted under 35 U.S.C. 154(b) by 505 days.

(21) Appl. No.: 17/118,995

(22) Filed: Dec. 11, 2020

(65) Prior Publication Data
US 2022/0190767 A1 Jun. 16, 2022

(51) Int. Cl.
*H02P 27/06* (2006.01)
*H02K 7/14* (2006.01)
*H02P 25/03* (2016.01)

(52) U.S. Cl.
CPC ............ *H02P 27/06* (2013.01); *H02K 7/145* (2013.01); *H02P 25/03* (2016.02)

(58) Field of Classification Search
CPC .......... H02P 27/06; H02P 25/18; H02P 25/03; H02K 7/145
See application file for complete search history.

(56) References Cited

U.S. PATENT DOCUMENTS

| | | | |
|---|---|---|---|
| 4,709,202 A | 11/1987 | Koenck et al. | |
| 5,691,078 A * | 11/1997 | Kozaki | G04C 10/04 324/428 |
| 5,990,664 A | 11/1999 | Rahman | |
| 6,310,449 B1 | 10/2001 | Dorfer | |
| 6,753,670 B2 | 6/2004 | Kadah | |
| 8,813,866 B2 | 8/2014 | Suzuki | |
| 9,085,076 B2 | 7/2015 | Zhamu et al. | |
| 9,124,118 B2 | 9/2015 | Klemm et al. | |
| 9,224,994 B2 * | 12/2015 | Ota | H01M 10/482 |
| 9,270,211 B2 | 2/2016 | Kaizo et al. | |
| 9,281,770 B2 | 3/2016 | Wood et al. | |
| 9,579,776 B2 | 2/2017 | Arimura et al. | |
| 9,673,738 B2 * | 6/2017 | Miller | H02P 4/00 |
| 10,498,151 B2 | 12/2019 | Karlsson et al. | |
| 10,797,281 B2 * | 10/2020 | Dietel | B25F 5/00 |
| 2006/0091858 A1 | 5/2006 | Johnson et al. | |

(Continued)

FOREIGN PATENT DOCUMENTS

| CN | 1443389 A | 9/2003 |
|---|---|---|
| CN | 2899270 | 5/2007 |

(Continued)

OTHER PUBLICATIONS

Combined Search and Examination Report for corresponding Application No. GB2116769.7 dated May 19, 2022, 7 pages.

(Continued)

*Primary Examiner* — Thai T Dinh
(74) *Attorney, Agent, or Firm* — Taft Stettinius & Hollister LLP

(57) ABSTRACT

A motorized hand tool, such as a cordless ratchet wrench, that has a motor, one or more electronic components and/or integrated circuits, and a step-up converter that are housed or disposed in a housing of the tool. The step-up converter is adapted to prevent a voltage of a battery of the tool from dropping below a threshold voltage of a component or integrated circuit when current draw from the battery increases, thus preventing a "brownout" condition.

19 Claims, 5 Drawing Sheets

(56) References Cited

U.S. PATENT DOCUMENTS

| | | | |
|---|---|---|---|
| 2009/0237012 A1* | 9/2009 | Yokoyama | B25F 5/00 429/90 |
| 2013/0000936 A1* | 1/2013 | Onoda | B25D 16/00 173/117 |
| 2013/0025893 A1* | 1/2013 | Ota | H02J 1/10 320/112 |
| 2015/0318581 A1 | 11/2015 | Johnson et al. | |
| 2016/0049817 A1 | 2/2016 | Karlsson et al. | |
| 2017/0334087 A1 | 11/2017 | Gass | |
| 2019/0052148 A1 | 2/2019 | Rahnamaee et al. | |
| 2019/0123314 A1* | 4/2019 | Dietel | H01M 50/213 |

FOREIGN PATENT DOCUMENTS

| | | |
|---|---|---|
| CN | 103326573 A | 9/2013 |
| CN | 103348581 A | 10/2013 |
| CN | 105189049 A | 12/2015 |
| CN | 206211869 U | 5/2017 |
| EP | 2696466 A2 | 2/2014 |
| EP | 2713474 | 4/2014 |
| EP | 3072452 A2 | 9/2016 |
| EP | 2779396 A2 | 9/2017 |
| TW | 200821102 A | 5/2008 |
| WO | 2010034162 | 4/2010 |
| WO | 2011129171 A1 | 10/2011 |
| WO | 2014051167 A2 | 4/2014 |
| WO | 2014177618 A2 | 11/2014 |

OTHER PUBLICATIONS

United Kingdom Combined Search and Examination Report for corresponding UK Application No. GB2304500.8, dated May 2, 2023, 6 pages.
Canadian Office Action for corresponding CA Application No. 3,141,201, dated Apr. 6, 2023, 3 pages.
Canadian Patent Office, Examination Report issued in corresponding Application No. 3,141,201, dated Feb. 5, 2025, 3 pp.
Chinese Patent Office, First Office Action issued in corresponding Application No. 202111491486.X, dated May 29, 2025, 21 pp.
Australian Patent Office, Examination Report No. 2 issued in corresponding Application No. 2023278052, dated Jun. 2, 2025, 3 pp.
Taiwan Patent Office, Office Action issued in corresponding Application No. 112140800, dated Sep. 5, 2024, 6 pp.

* cited by examiner

TOOL BROWNOUT MANAGEMENT

TECHNICAL FIELD OF THE INVENTION

The present invention relates to devices and methods for managing brownout in power tools.

BACKGROUND OF THE INVENTION

Power hand tools, such as motorized ratchet wrenches and drivers, are commonly used in automotive, industrial and household applications to install and remove threaded fasteners and apply a torque and/or angular displacement to a work piece, such as a threaded fastener, for example. Power hand tools generally include an electric motor contained in a housing along with other electronic components and a battery.

However, when a large current load is placed on the battery, the battery voltage decreases or drops during operation of the tool. If the battery voltage drops below an acceptable operating voltage of an electronic component or circuit, the electronic component/circuit can malfunction, reset, or prematurely shutdown due to the voltage shortfall. This can cause the tool to cease functioning and shutdown unexpectedly, or otherwise damage internal electrical components/circuits. Current solutions to minimize the effects caused by a decrease in voltage include decreasing current load and/or using a high voltage battery. However, these solutions can be impractical and costly.

SUMMARY OF THE INVENTION

The present invention relates broadly to a motorized hand tool, such as, for example, a cordless ratchet wrench, driver or drill, that has a motor, one or more electronic components and/or integrated circuits, and a step-up converter, that are housed or disposed in a housing of the tool. The step-up converter is adapted to prevent the voltage to be passed to a component or integrated circuit (IC) from dropping below a threshold voltage value (which may be a desired threshold voltage or desired boosted voltage value that is equal to or greater than a minimum operating voltage of the component or IC) when current draw from the battery increases, thus preventing a "brownout" condition.

For example, when the battery voltage drops or the voltage to be passed to the component/IC drops below the threshold voltage (which may be a desired boosted voltage value that is at or above a minimum operating voltage of the component/IC), the step-up converter boosts the voltage to a boosted voltage out that is at or above the threshold voltage. When the battery voltage or the voltage to be passed to the component/IC is at or above the threshold voltage (which may be the desired boosted voltage value), the step-up converter passes the voltage to the components/ICs unmodified. The step-up converter allows the tool to operate at higher loads without unintentional shutdown or component damage due to a brownout condition, and the step-up converter is more size and cost effective than a step-up/step-down converter.

In an embodiment, the present invention relates broadly to an electric circuit adapted to be disposed in a tool. The electrical circuit includes a power source and a motor electrically coupled to the power source. The electrical circuit also includes a step-up converter having an input and an output, wherein the input is electrically coupled to the power source, and an electrical component electrically coupled to the output of the step-up converter, wherein the step-up converter and electrical component are in a parallel configuration with the motor.

In another embodiment, the present invention relates broadly to a method of operating a tool. The method includes receiving, by a step-up converter, a voltage in from a power source, wherein the step-up converter includes an input coupled to the power source, and an output coupled to an electrical component, wherein the step-up converter and electrical component are in a parallel configuration with the motor. The method further includes increasing, by the step-up converter, the voltage in from the power source to a boosted voltage out when a voltage out of the step-up converter is less than a threshold voltage value, wherein the threshold voltage value is greater than or equal to a minimum operating voltage of the electrical component; and passing, by the step-up converter, the boosted voltage out to the electrical component.

In another embodiment, the present invention relates broadly to a tool. The tool includes a drive adapted to apply torque to a work piece, a motor operably coupled to the drive, and a power source electrically coupled to the motor. The tool also includes a step-up converter having an input and an output, wherein the input is electrically coupled to the power source, and an electrical component electrically coupled to the output of the step-up converter, wherein the step-up converter and electrical component are in a parallel configuration with the motor.

BRIEF DESCRIPTION OF THE DRAWINGS

For the purpose of facilitating an understanding of the subject matter sought to be protected, there is illustrated in the accompanying drawing embodiments thereof, from an inspection of which, when considered in connection with the following description, the subject matter sought to be protected, its construction and operation, and many of its advantages, should be readily understood and appreciated.

DETAILED DESCRIPTION

Figure 1:
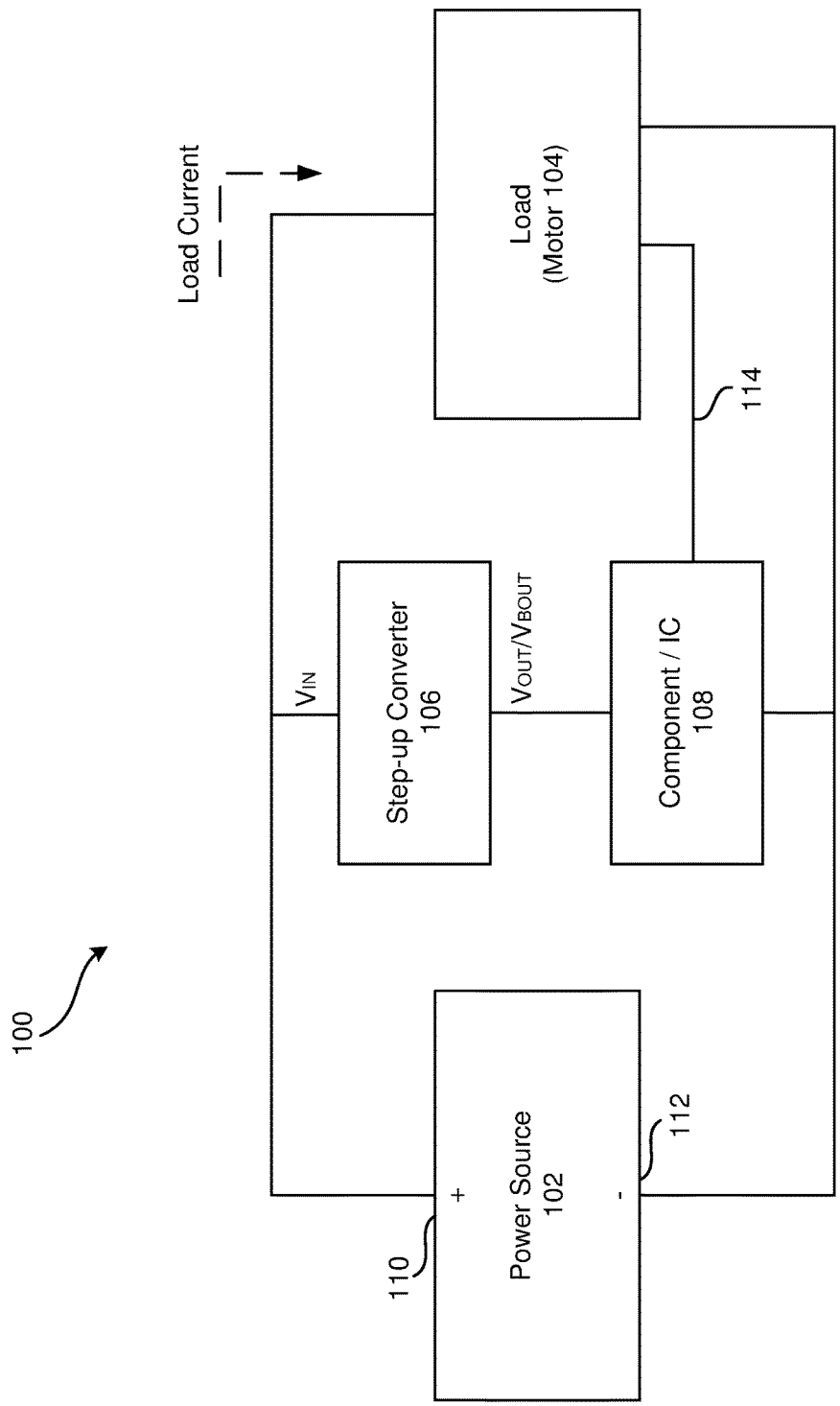
FIG. 1 is a block diagram of an exemplar circuit adapted to be implemented in a tool, according to an embodiment of the present invention.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention relates broadly to a motorized hand tool, such as, for example, a cordless ratchet wrench, driver or drill, that has a motor, one or more electronic components and/or integrated circuits, and a step-up converter, that are all housed or disposed in a housing of the tool. The step-up converter is adapted to keep the voltage delivered to a component or integrated circuit (IC) at or above its acceptable minimum operating voltage when current drawn from the battery increases, thus preventing a "brownout" condition.

For example, when the battery voltage drops or the voltage to be passed to the component/IC drops below a threshold voltage value (which may be a desired threshold voltage or desired boosted voltage value that is at or above a minimum operating voltage of the component/IC), the step-up converter boosts the voltage to a boosted voltage out that is at or above the threshold voltage value. When the battery voltage or the voltage to be passed to the component/IC is at or above the threshold voltage (which may be the desired boosted voltage value), the step-up converter passes the voltage to the components/ICs unmodified. The step-up converter allows the tool to operate at higher loads without unintentional shutdown or component damage due to a brownout condition, and the step-up converter is more size and cost effective than a step-up/step-down converter.

Referring to FIG. 1, a circuit 100 for a power tool, such as, for example, a cordless ratchet tool, driver or drill, is shown. The circuit 100 may include a power source 102, a motor 104, a step-up converter 106, and one or more electronic components and/or integrated circuits (ICs) 108. The circuit 100 may be implemented in any type of tool powered by electricity. For example, the circuit 100 may be implemented in a ratchet wrench, torque wrench, drill, router, impact wrench, screwdriver, sander, or other electrically powered tool.

The power source 102 may be a battery including one or more cells, or an external power source, such as a wall outlet, generator, or other type of source of electrical power. In an example, the battery may be a rechargeable type battery, such as a lead-acid, zinc-air, nickel-cadmium (NiCd), nickel-metal hydride (NiMH), lithium-ion (Li-ion), Lithium Iron Phosphate (LiFePO$_4$), and/or lithium-ion polymer (Li-ion polymer) type battery. As illustrated, the power source 102 includes at least two terminals, including a positive terminal 110 and a negative terminal 112.

The motor 104 may be any type of electrically powered motor, such as a brushed type motor or a brushless type motor. The motor 104 may be electrically coupled to the power source 102, which includes a direct or indirect electrical coupling. For example, the motor 104 may be directly electrically coupled to the positive terminal 110 and negative terminal 112. In another embodiment, the motor 104 may be indirectly electrically coupled to the positive terminal 110 and negative terminal 112, with one or more electrical components electrically disposed between the power source 102 and the motor 104.

The step-up converter 106 may be a separate component/sub-circuit or integrated into an integrated circuit. As illustrated, the step-up converter 106 includes an input electrically coupled to the power source 102, and the step-up converter 106 is disposed in a parallel configuration with the motor 104. For example, separate currents are allowed to flow from the power source 102 to the step-up converter 106 and to the motor 104 simultaneously.

The electronic components and/or ICs 108 may be any number and type of electronic components and/or integrated circuits commonly implemented in tools. For example, the electronic components and/or ICs 108 may include a microcontroller, LED, LED driver, display, trigger and/or switch mechanism, etc.

One or more of the electronic components and/or ICs 108 may have a minimum operating voltage $V_{MIN}$, at which the electronic component and/or IC 108 can malfunction and cause the electronic component and/or IC 108 to reset, shutdown, or be damaged due to brownout. For example, if a voltage of the power source 102 drops or decreases below the minimum operating voltage $V_{MIN}$, the electronic component and/or IC 108 may malfunction and cause a brownout and cease functioning and/or shutdown unexpectedly, and render the tool inoperable.

In an embodiment, one or more of the electronic components and/or ICs 108 may include an input electrically coupled to an output of the step-up converter 106 (which includes an input electrically coupled to the power source 102), and in series or parallel configuration with each other. Thus, voltage and current flows from the power source 102 into the step-up converter 106, and voltage and current output from the step-up converter 106 flows into the electronic components and/or ICs 108.

The electronic component(s) and/or IC(s) 108 may also optionally be electrically coupled to the motor 104, as illustrated by connection 114 in FIG. 1. The connection 114 allows the electronic component(s) and/or IC(s) 108 to transmit/send and receive optional control or feedback signals with the motor 104.

The step-up converter 106 may include a threshold voltage or boosted voltage value $V_{BOOST}$ that is equal to or greater than a minimum operating voltage $V_{MIN}$ of the electronic component(s) and/or IC(s) 108. Voltage of the power source 102 proportionally decreases as current draw increases. When the voltage of the power source 102 drops or decreases below the boosted voltage value $V_{BOOST}$, for example, due to an increased load current on the motor 104, the step-up converter 106 boosts the voltage to a boosted voltage out $V_{BOUT}$. When the voltage of the power source 102 is at or above the boosted voltage value $V_{BOOST}$, the step-up converter 106 passes the voltage unmodified to the electronic component/IC 108. The step-up converter 108 allows the tool to operate at higher loads without unintentional premature shutdown due to brownout.

In an example, the step-up converter 106 monitors a voltage out $V_{OUT}$ of the step-up converter 106, which is to be passed from the step-up converter 106 to the electronic component/IC 108. When the voltage out $V_{OUT}$ drops or decreases below the boosted voltage value $V_{BOOST}$, for example, due to an increased load current on the motor 104, the step-up converter 106 boosts the voltage to the boosted voltage out $V_{BOUT}$. The boosted voltage out $V_{BOUT}$ is then passed from the step-up converter 106 to the electronic component/IC 108.

Figure 2:
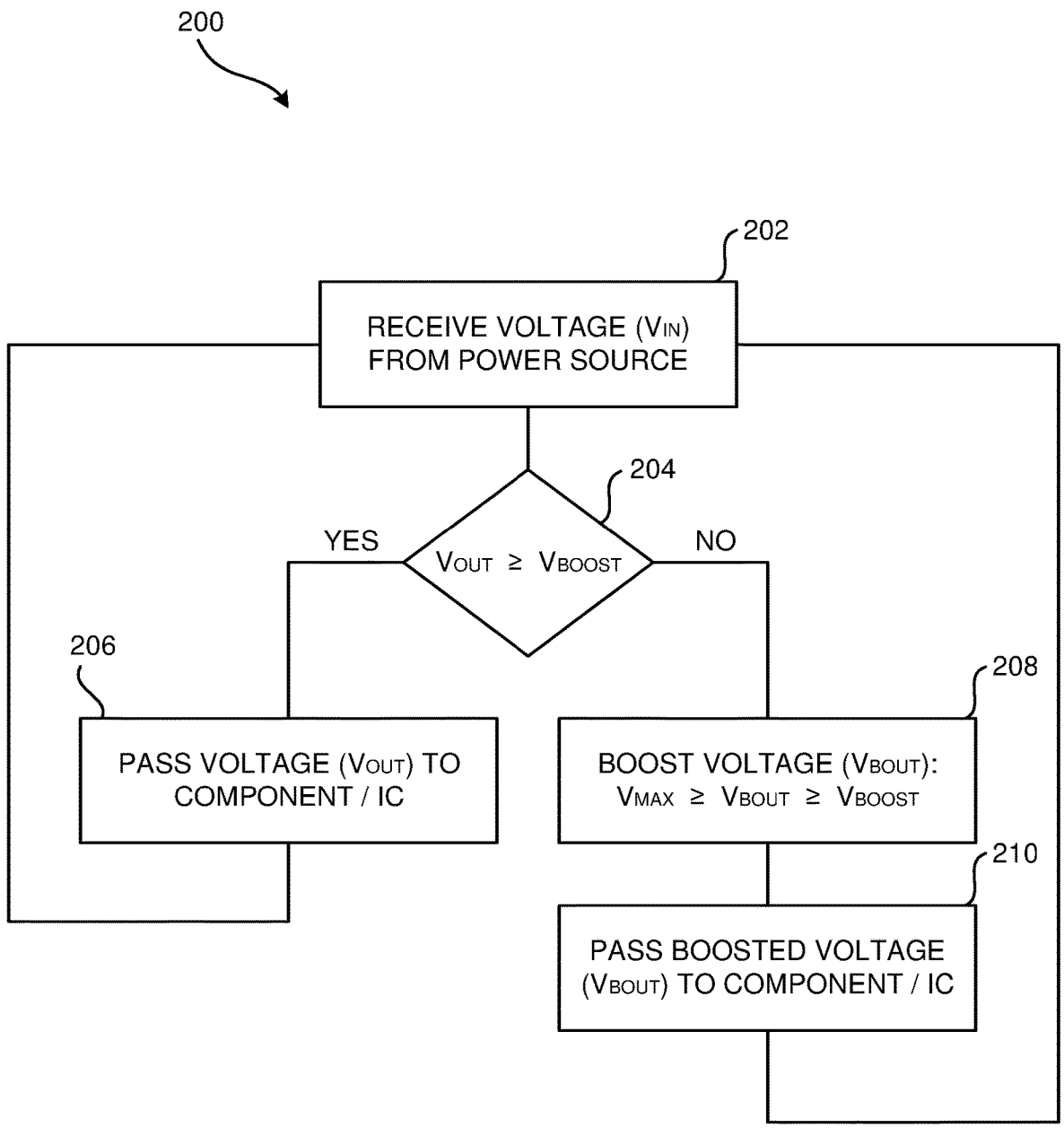
FIG. 2 is a block diagram of an exemplar method of operation of a step-up converter, according to an embodiment of the present invention.

Referring to FIGS. 1 and 2, a method 200 of operation of the step-up converter 102 is described. The step-up converter 106 receives a voltage in $V_{IN}$ from the power source 102 (illustrated as block 202). As described above, the step-up converter 106 is electrically coupled to the power source 102 in a parallel configuration with the motor 104. Thus, the motor 104 also receives a voltage in from the power source 102.

In response to, or after, receiving the voltage in $V_{IN}$ from the power source 102, the step-up converter 106 determines whether a voltage out $V_{OUT}$ of the step-up converter 106, which is to be passed to the electronic components/ICs 108, is greater than or equal to a threshold voltage or boosted voltage value $V_{BOOST}$ (illustrated as block 204). As described above, one or more of the electronic components and/or ICs 108 may include an input electrically coupled to an output of the step-up converter 106 (which includes an input electrically coupled to the power source 102). Thus, voltage and current flows from the output of the power source 102 into the step-up converter 106 as $V_{IN}$, and voltage and current output from the step-up converter 106 flows into the electronic components and/or ICs 108 as $V_{OUT}$ or $V_{BOUT}$.

When the voltage out $V_{OUT}$ of the step-up converter 106 to be passed to the electronic components and/or ICs 108, is equal to or greater than the boosted voltage value $V_{BOOST}$, the step-up converter 106 passes the voltage as a voltage output $V_{OUT}$ to the one or more electronic components/ICs 108 (illustrated as block 206). The process may then repeat or loop back to block 202.

When the voltage out $V_{OUT}$ of the step-up converter 106 to be passed to the electronic components and/or ICs 108, is less than the boosted voltage value $V_{BOOST}$, which is equal to or greater than the minimum operating voltage $V_{MIN}$ of the one or more electronic components/ICs 108, the step-up converter 106 boosts or increases the voltage in $V_{IN}$ from the power source 102 to the boosted voltage output $V_{BOUT}$, such that the boosted voltage output $V_{BOUT}$ is equal to or greater than the desired boosted voltage value $V_{BOOST}$, and equal to or less than a maximum output voltage ($V_{OUT-MAX}$) of the step-up converter 106 or maximum input voltage ($V_{IN-MAX}$) of the electronic components/ICs 108 (illustrated as block 208). As illustrated, $V_{OUT-MAX}$ and/or $V_{IN-MAX}$ are represented by $V_{MAX}$. The step-up converter 106 then passes the boosted voltage output $V_{BOUT}$ to the one or more electronic components/ICs 108 (illustrated as block 210). The process may then repeat or loop back to block 202. Thus, the step-up converter 108 allows the tool to operate at higher loads without unintentional premature shutdown or damage due to brownout/decrease in output voltage of the power source 102.

Figure 3:
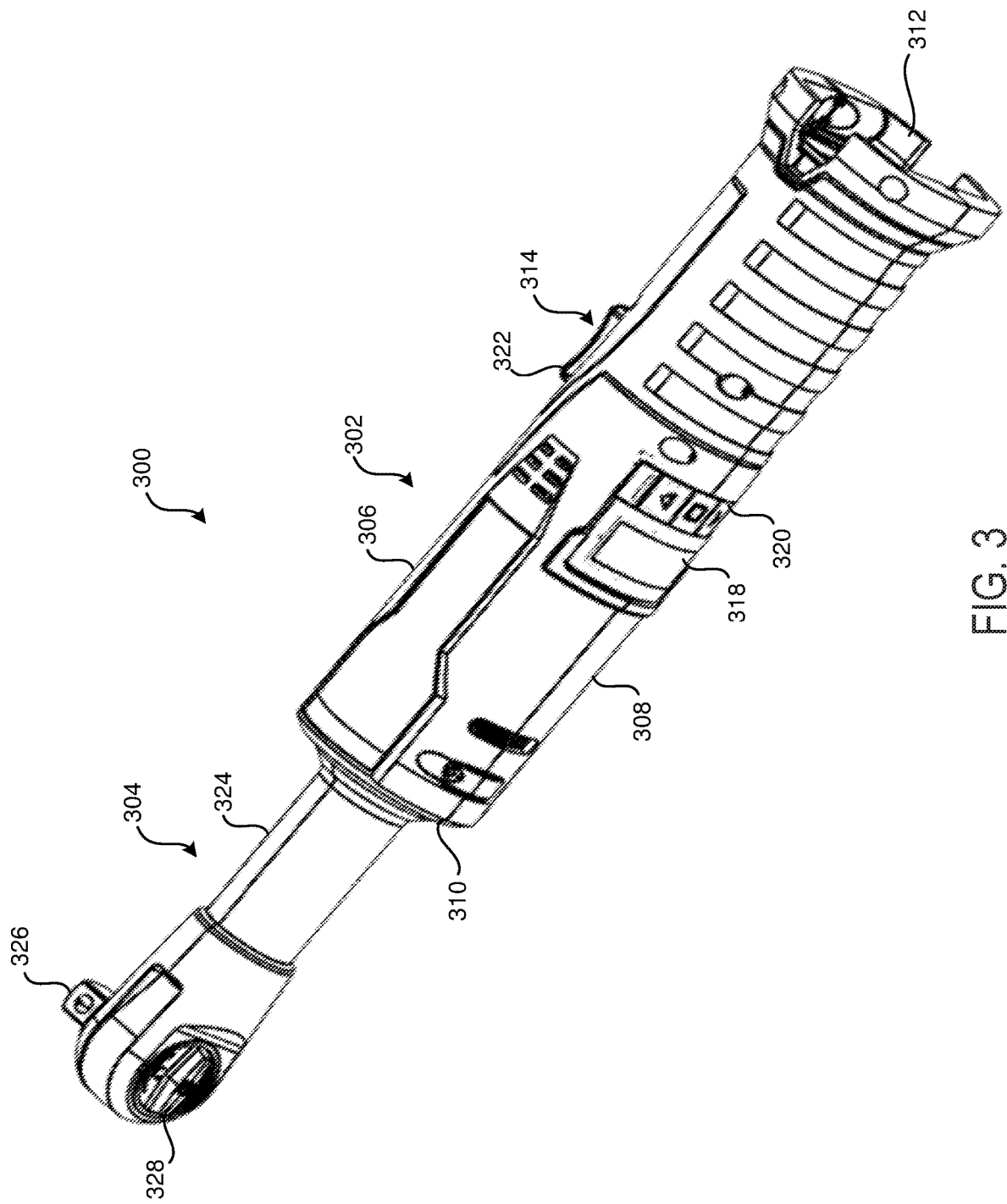
FIG. 3 is perspective view of an exemplar tool, according to an embodiment of the present invention.
Figure 4:
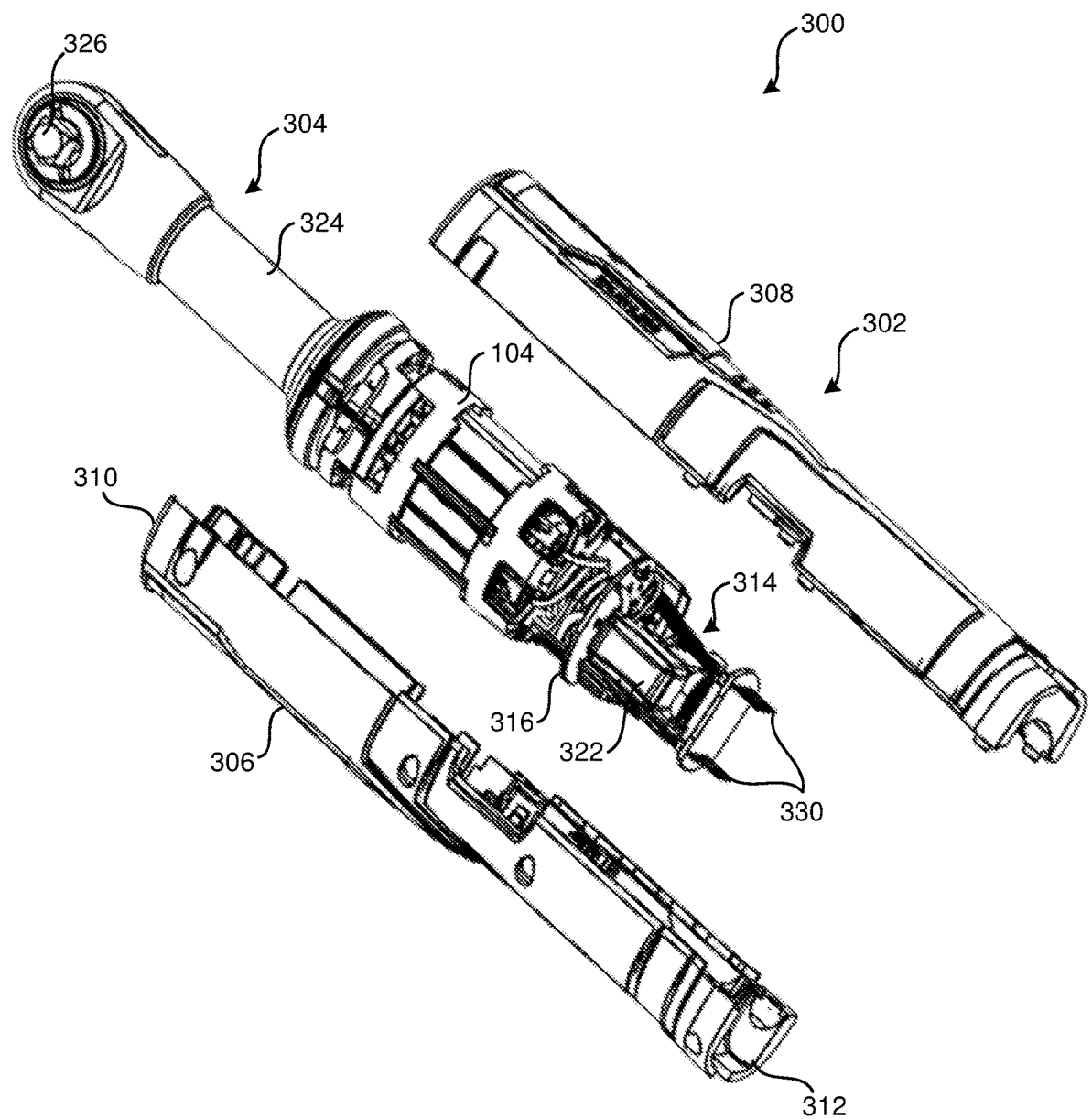
FIG. 4 is a first exploded view of the tool of FIG. 3, according to an embodiment of the present invention.
Figure 5:
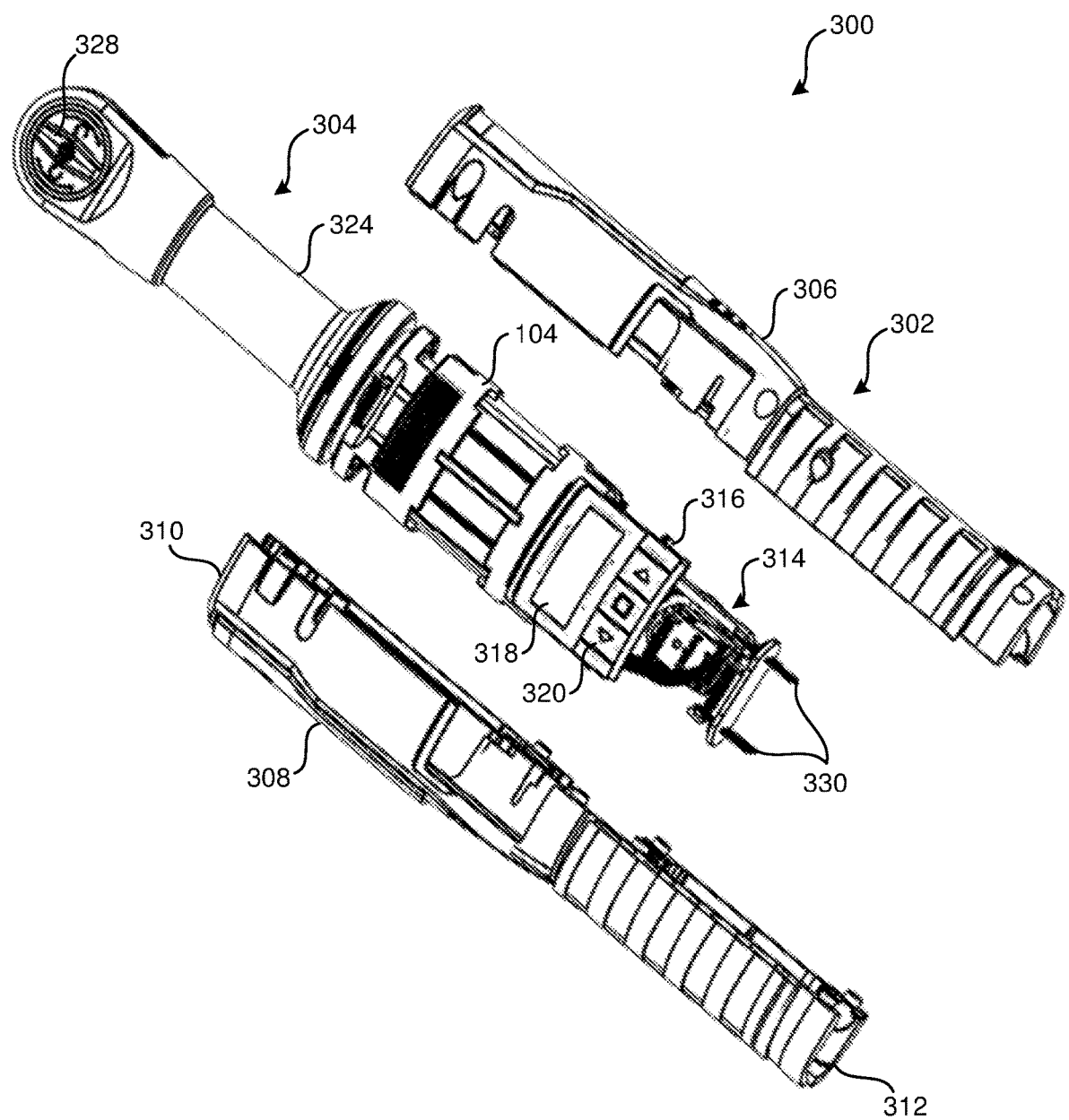
FIG. 5 is a second exploded view of the tool of FIG. 3, according to an embodiment of the present invention.

As described above, the step-up converter 106 may be implemented in a tool. Referring to FIGS. 3-5, the step-up converter 106 is implemented in a tool 300, such as a cordless ratchet wrench. The tool 300 includes a main tool housing 302 and a ratchet head assembly 304. The tool housing 302 may include first and second housing portions 306 and 308 that are coupled together in a clamshell type manner to cooperatively form the tool housing 302. The tool housing 302 also includes first and second ends 310, 312. The first end 310 is adapted to couple to a torque application head, such as, for example, ratchet head assembly 304, and the second end 312 is adapted to receive the power source 102, such as a battery. The tool housing 302 may enclose or house the electric motor 104 and one or more other electronic components/ICs 108, such as a switch assembly 314, controller 316, display 318 with buttons 320 for configuring and setting the tool 300, and one or more status indicators such as light emitting diodes, for example. The tool housing 302 may also include a textured grip to improve a user's grasp of the tool 300 during use.

In an embodiment, the tool 300 further includes a trigger 322 that can be actuated by a user to cause the tool 300 to operate. For example, the user can depress the trigger 322 inwardly to selectively cause power to be drawn from the power source 102 and cause a motor 104 to provide torque to the ratchet head assembly 304 in a desired rotational direction. Any suitable trigger 322 or switch can be implemented without departing from the spirit and scope of the present invention. For example, the trigger 322 may also be biased such that the trigger 322 is depressible inwardly, relative to the tool housing 302, to cause the tool 300 to operate, and releasing the trigger 322 causes the trigger 322 to move outwardly, relative to the tool housing 302, to cease operation of the tool 300 via the biased nature of the trigger 322. The trigger 322 and switch mechanism 314 may also be a variable speed type mechanism. In this regard, relative actuation or depression of the trigger 322 causes the motor 104 to operate at a faster speed the further the trigger 322 is depressed.

The ratchet head assembly 304 includes a ratchet housing 324, drive or drive lug 326, and selector knob 328, for example. The drive 326 is adapted to apply torque to a work piece, such as a fastener, via an adapter, bit, or socket coupled to the drive 326, such as a bi-directional ratcheting square or hexagonal drive. As illustrated, the drive 326 is a "male" connector designed to fit into or matingly engage a female counterpart. However, the drive 326 may be a "female" connector designed to matingly engage a male counterpart. The drive 326 may also be structured to directly engage a work piece without requiring coupling to an adapter, bit, or socket. The rotational direction of the drive 326 can be selected by rotation of the selector knob 328 to be either a first or second rotational direction (such as, clockwise or counterclockwise).

Referring to FIGS. 4 and 5, the tool 300 includes a motor 104 with a motor housing and a motor drive gear adapted to operably engage the ratchet head assembly 304, and that provides torque to the tool 300 and, in turn, to the drive 326. The power source 102 can be associated with the tool 300 to provide electric power to the tool 300 to drive the motor 104. In an embodiment, the power source 102 can be housed in the second end 312 of the tool housing 302, opposite the drive 326, midsection, or any other portion of the tool 300. The power source 102 may also be an external component that is not housed by the tool housing 302, but that is operatively coupled to the tool 300 through, for example, wired or wireless means. In an embodiment, the power source is a battery that is adapted to be disposed in the second end 312 of the tool housing 300 and electrically coupled to corresponding terminals 330 of the tool 300.

As illustrated, the motor 104 and switch mechanism 314 are disposed in the tool housing 302, and the switch mechanism 314 is operably coupled to the motor 104. The actuatable trigger 322 is operably coupled to the switch mechanism 314, such that actuation of the trigger 322 (such as depression of the trigger 322) causes the motor 104 to operate and selectively rotate the drive 326 in either one of first and second rotational directions (clockwise or counterclockwise) in a well-known manner. The switch mechanism 322 may also be coupled to the controller 316 (which may include a printed circuit board) including terminals 330 or battery contacts that operably couple to corresponding electrical contacts on a removable battery.

The step-up converter 106 may be implemented in or disposed in a series configuration with the controller 316. In this regard, the step-up converter 106 is disposed electrically between the power source 102 and one or more of the controller 316, switching mechanism 314, display 318, and other electronic components/ICs of the tool 300. The step-up converter 106 operates as described above to prevent a voltage passed to the electronic components/ICs of the tool 300 from dropping below a boosted voltage value $V_{BOOST}$ when current draw from the power source 102 increases, for example, due to an increased load on the motor 104. In an example, this increased load can be caused by operation of the motor 104 to apply a torque via the drive 326 to a fastener.

As discussed herein, the step-up converter is implemented in a tool that is a ratchet type wrench. However, the step-up converter can be incorporated into any electrically powered or hand-held tool, including, without limitation, a drill, router, or impact wrench, ratchet wrench, screwdriver, or other powered tool, that is powered by electricity via an external power source (such as a wall outlet and/or generator outlet) or a battery.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object. As used herein, the term "a" or "one" may include one or more items unless specifically stated otherwise.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. An electric circuit adapted to be disposed in a tool, the electrical circuit comprising:
   a power source;
   a motor electrically coupled to the power source;
   a step-up converter having an input and an output, wherein the input is electrically coupled to the power source; and
   an electrical component electrically coupled to the output of the step-up converter, wherein the step-up converter and the electrical component are disposed in an electrically parallel configuration with the motor.

2. The electrical circuit of claim 1, wherein the step-up converter is adapted to receive a voltage in from the power source.

3. The electrical circuit of claim 2, wherein the step-up converter is adapted to determine whether a voltage out of the step-up converter is less than a threshold voltage value, wherein the threshold voltage value is greater than or equal to a minimum operating voltage of the electrical component.

4. The electrical circuit of claim 3, wherein the step-up converter is adapted to pass the voltage out to an input of the electrical component when the voltage out is greater than or equal to the threshold voltage value.

5. The electrical circuit of claim 3, wherein the step-up converter is adapted to increase the voltage in from the power source to a boosted voltage out when the voltage out is less than the threshold voltage value.

6. The electrical circuit of claim 5, wherein the step-up converter is adapted to pass the boosted voltage out to an input of the electrical component.

7. A method of operating a tool, comprising:
   receiving, by a step-up converter, a voltage in from a power source, wherein the step-up converter includes an input coupled to the power source and an output coupled to an electrical component, wherein the step-up converter and the electrical component are disposed in an electrically parallel configuration with a motor;
   increasing, by the step-up converter, the voltage in from the power source to a boosted voltage out when a voltage out of the step-up converter is less than a threshold voltage value, wherein the threshold voltage value is greater than or equal to a minimum operating voltage of the electrical component; and
   passing, by the step-up converter, the boosted voltage out to the electrical component.

8. The method of claim 7, further comprising determining, by the step-up converter, whether the voltage out is greater than or equal to the threshold voltage value.

9. The method of claim 8, further comprising passing, by the step-up converter, the voltage out to the electrical component when the voltage out is greater than or equal to the threshold voltage value.

10. A tool, comprising:
    a drive adapted to apply torque to a work piece;
    a motor operably coupled to the drive;
    a power source electrically coupled to the motor;
    a step-up converter having an input and an output, wherein the input is electrically coupled to the power source; and
    an electrical component electrically coupled to the output of the step-up converter, wherein the step-up converter and the electrical component are disposed in an electrically parallel configuration with the motor.

11. The tool of claim 10, wherein the step-up converter is adapted to receive a voltage in from the power source.

12. The tool of claim 11, wherein the step-up converter is adapted to determine whether a voltage out of the step-up converter is greater than or equal to a threshold voltage value, wherein the threshold voltage value is equal to or greater than a minimum operating voltage of the electrical component.

13. The tool of claim 12, wherein the step-up converter is adapted to pass the voltage out to the electrical component when the voltage out is greater than or equal to the threshold voltage value.

14. The tool of claim 12, wherein the step-up converter is adapted to increase the voltage in from the power source to a boosted voltage out when the voltage out is less than the threshold voltage value.

15. The tool of claim 14, wherein the step-up converter is adapted to pass the boosted voltage out to the electrical component.

16. The tool of claim 11, wherein the motor is a brushed or a brushless type motor.

17. The tool of claim 11, wherein the electrical component is an integrated circuit.

18. The tool of claim 11, wherein the electrical component includes one or more of a controller, a switching mechanism, and a display.

19. The tool of claim 11, wherein the power source is a rechargeable battery.

* * * * *